March 3, 1942.  W. H. CHARCH ET AL  2,275,348
CELLULOSIC FILM AND METHOD OF MAKING
Filed Jan. 12, 1940  2 Sheets-Sheet 1

INVENTORS
William Hale Charch
Francis P. Alles
BY
ATTORNEY

March 3, 1942.   W. H. CHARCH ET AL   2,275,348
CELLULOSIC FILM AND METHOD OF MAKING
Filed Jan. 12, 1940   2 Sheets-Sheet 2
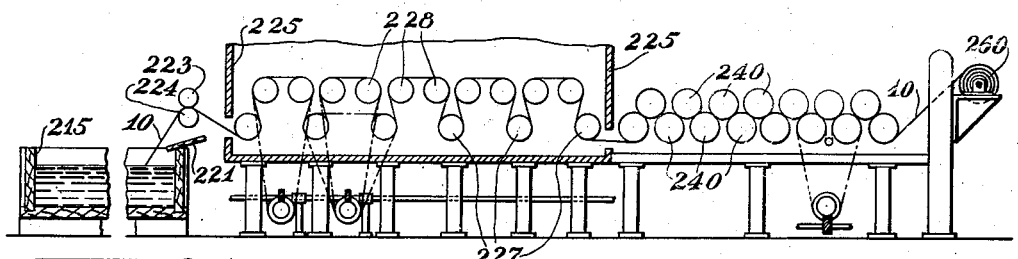
Fig. 2
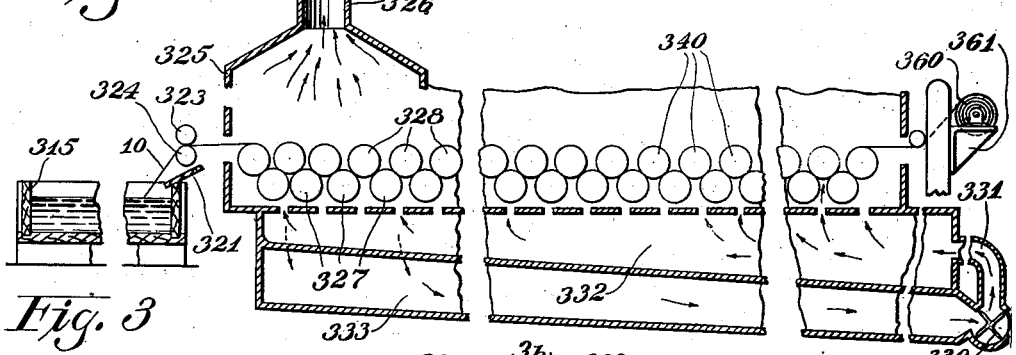
Fig. 3
Fig. 3a   Fig. 3b   Fig. 3c   Fig. 3d
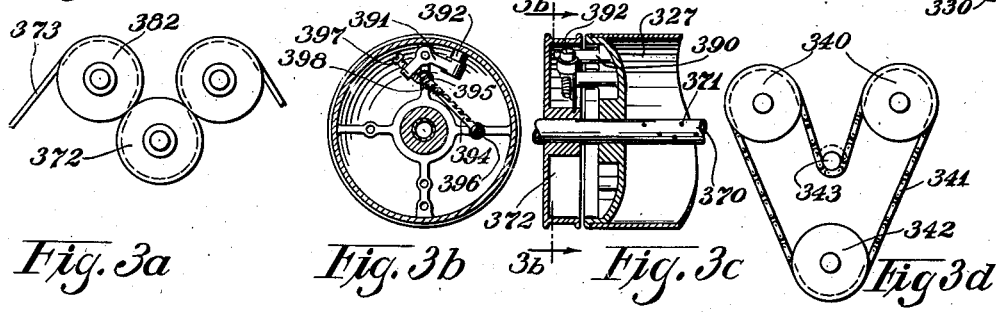
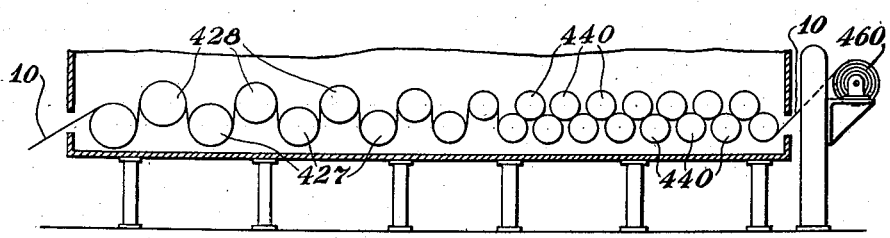
Fig. 4
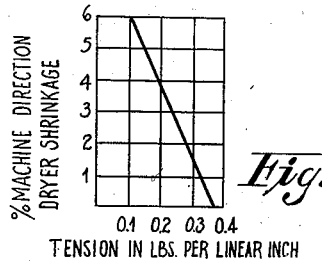
Fig. 5
William Hale Charch
Francis P. Alles   INVENTORS
BY
ATTORNEY Patented Mar. 3, 1942

2,275,348

UNITED STATES PATENT OFFICE 2,275,348

CELLULOSIC FILM AND METHOD OF MAKING

William Hale Charch, Buffalo, and Francis P. Alles, Williamsville, N. Y., assignors to E. I. du Pont de Nemours & Company, Wilmington, Del., a corporation of Delaware Application January 12, 1940, Serial No. 313,502

15 Claims. (Cl. 18—57).

This invention relates to the drying of non-fibrous cellulosic sheet material, especially to the removal of water from gel cellulose web. More particularly, it appertains to a method of drying continuous films of regenerated cellulose in which the gel sheeting is passed through a drying machine in a manner such that it is allowed or permitted to shrink in the machine (or casting) direction (the direction in which the film travels through the manufacturing apparatus) during the initial stage (or stages) and is prevented from shrinking during the final stage, whereby a sheet material having a reduced tendency to cake or stick together (when stacked), an improved slip (particularly when in contact with other sheets of the same material), improved durability (toughness) and very low permanent shrinkage (shrinkage with age) is obtained. This application is a continuation-in-part of our application Serial No. 46,324, filed October 23, 1935.

The manufacture of sheet wrapping material by continuously regenerating cellulose from aqueous solutions of sodium cellulose xanthate (viscose) is carried out on a large scale. A typical procedure is disclosed in U. S. A. Patent No. 1,548,864 (Brandenberger). Such a process commonly involves forcing the viscose through an elongated orifice in the form of a sheet into a coagulating bath to form a coherent web, which freshly coagulated film is then promptly regenerated, washed, desulfured, bleached, softened (glycerinated) and dried. It is customary to wind the dried film into rolls (the so-called "mill rolls") for convenience in handling, storing and processing.

Up through the softening stage the web remains in gel (completely saturated with aqueous solution) condition. Since gel regenerated cellulose film contains about 350% to 400% of moisture (based on the weight of the cellulose), a very substantial amount of moisture must be removed in the drying operation. In losing this moisture the film tends to shrink to a great extent (thus diminishing the area of the film obtained), and to become puckered and wrinkled. To prevent loss of area, the formation of surface irregularities (puckers, wrinkles and the like), and impairment of transparency, it is customary to dry the web without substantial machine direction shrinkage by passing it about a series of heated rolls which are operated at speeds which maintain, in the film, a tension sufficient to lessen or prevent the aforementioned decrease in area and surface deformation.

Film dried in this manner (which for convenience may be termed "normal drying") has an objectionable characteristic commonly referred to as "permanent shrinkage." This characteristic is evidenced by a gradual shrinkage of the film with age. The shrinking is accelerated when the film is subjected to wide fluctuations and other variations in moisture content.

Normally dried regenerated cellulose sheets have, in addition to the disadvantage of permanent shrinkage, other drawbacks, for example, low durability, tendency to cake when stacked, poor slip, etc. The toughness of normally dried film is not nearly as great as users of the same would like. Much time and effort has been spent in an attempt to produce regenerated cellulose sheet free from the aforementioned drawbacks.

Regenerated cellulose normally maintains an equilibrium (with the atmosphere) moisture content of about 6%, and it is customary to stop the drying operation when this stage is reached. Free shrinkage during the final portion of the drying step may be brought about by progressively lowering the speed of the last rolls (those on which the web loses the last 40% to 100% of of the moisture to be removed) in the ordinary drying apparatus. This satisfactorily solves the problem of permanent shrinkage, but it has not improved durability to the extent desired by the trade, or satisfactorily decreased the tendency to cake.

This invention had for an object the preparation of non-fibrous sheet material having good transparency and flexibility, and greatly improved toughness. Another object was to produce regenerated cellulose sheet material having little or no "permanent shrinkage" and satisfactory durability or toughness. Still another object was to produce a transparent, flexible, regenerated cellulose film having great toughness along with good surface slip, freedom from curling and freedom from sticking. Yet further objects were to produce films of regenerated cellulose having characteristics greatly superior to those produced by normal or conventional methods, to produce non-fibrous sheets and films having good transparency and flexibility and of greatly increased durability or toughness compared to films of similar softener content hitherto known, and to produce non-fibrous sheet and film having the desired degree of flexibility, durability and toughness with lower amounts of softener. A still further object was to produce continuous regenerated cellulose web material having very low permanent shrinkage, improved slip, less tendency to cake and improved toughness and durability. A general advance in the art, and other objects which will appear hereinafter, were also contemplated.

In general the objects of this invention are obtained by drying a web or film of regenerated cellulose in such a manner that a substantial amount (10% to 60% of the potential shrinkage) of shrinkage (in the machine direction) is permitted during the first part, and substantially no shrinkage is permitted during the latter part, of the drying process.

From the following description and specific examples, in which are disclosed certain embodiments of the invention as well as details of what is believed to be the best mode for carrying out the invention, it will be apparent how the foregoing objects and related ends are accomplished. The written description is amplified by the accompanying drawings, in which:

Figure 2 is an elevation view of another form of drying apparatus in which a set of variable speed drying rolls precedes a set of drying rolls of ordinary construction;

Figure 3 is an elevation view illustrating another drying apparatus in which a set of equally spaced variable speed drying rolls precedes the conventional drying roll section;

Figure 6:
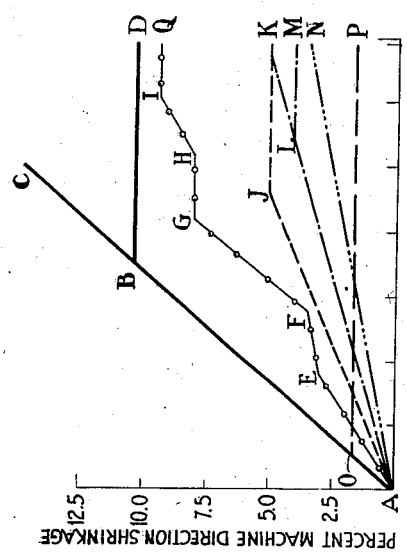

Figure 3—a is an elevation view showing part of the driving arrangement on the end of the variable speed rolls near the entrance end of the drier of Figure 3;

Figure 3—b is an elevation view partly in section, showing part of the driving arrangement on the variable speed rolls of Figures 3 and 3—a;

Figure 3—c is a sectional elevation view through the end of one of the variable speed rolls of Figures 3 and 3—a;

Figure 3—d is an elevation view showing part of the driving arrangement on the end of the constant speed rolls near the exit end of the drier of Figure 3;

Figure 4 is a sectional elevation view of a drier in which a series of variable diameter drying rolls precedes the normal drying roll section;

Figure 5 is an illustrative chart showing the relation between the machine direction shrinkage and the tension on the film during the drying of a film from a particular type of viscose; and Figure 6 is an illustrative chart showing some of the drying patterns possible with the present invention.

Similar characters refer to similar parts throughout the drawings.

In the prior art drier effecting "normal drying" (previously described), all of the rolls serving to forward the film through the apparatus are positively driven (by means of belts, gears, or equivalent devices) at a constant and uniform surface velocity (like rolls 5 and 6 in U. S. A. Patent No. 2,115,132). As previously stated, this method of driving the rolls prevents shrinkage of the web in the machine direction. The tendency of pellicular structures, like regenerated cellulose, to shrink while drying, results in the production of considerable tension in the film during such a treatment. This tension in some cases may be so great as to rupture the film.

In the normal process of continuous drying transverse shrinkage is not prevented, but it is restrained or inhibited a certain amount, depending upon the friction between the surface of the rolls and the film, and the tension developed by the shrinkage. Ordinarily a decrease in the width of the film, in the neighborhood of 10% (the potential shrinkage is approximately 35%), occurs. This difference (brought about during drying) in shrinkage effects between the machine direction and the transverse direction, may lead to a general inhomogeneity of the finished film (or promote the same if already present) which shows up later, causing distortions of the sheet material. It is probably the result of a special orientation of the micelles of the cellulose and a general distortion of the molecular structure. This renders such a product undesirable as a wrapping tissue, a closure for window-openings in packages, a material laminated to paper, and the like. The use of the material for certain purposes requiring good durability is impaired also, because of the tendency of the same to rupture much more freely in one direction than the other.

The preferred form of apparatus for carrying out that embodiment of the present invention in which the film is dried (preliminarily) with a substantially complete absence of tension (i. e., under conditions which allow it to shrink freely in all directions) to the condition where it contains about 100% to 200% water (based on the weight of the cellulose), is substantially the same as that shown in U. S. A. Patent No. 2,099,162 (Eberlin). The apparatus of the patent should be modified so as to achieve this shrinkage and should dry the film without tension down to the required moisture content. It should be emphasized that the tension should be substantially eliminated in all directions. For example, in operating the said drier to produce the ordinary film, shrinkage is substantially completely prevented in the longitudinal direction or the direction of travel of the film, due to the fact that the film, after traversing the said drier, is traveling at substantially as high a rate of speed as before entering said drier. When operating in accordance with this embodiment of the present invention, however, the said drier must be operated in such a manner that the film within the drier is entirely free to shrink in all directions.

Figure 1:
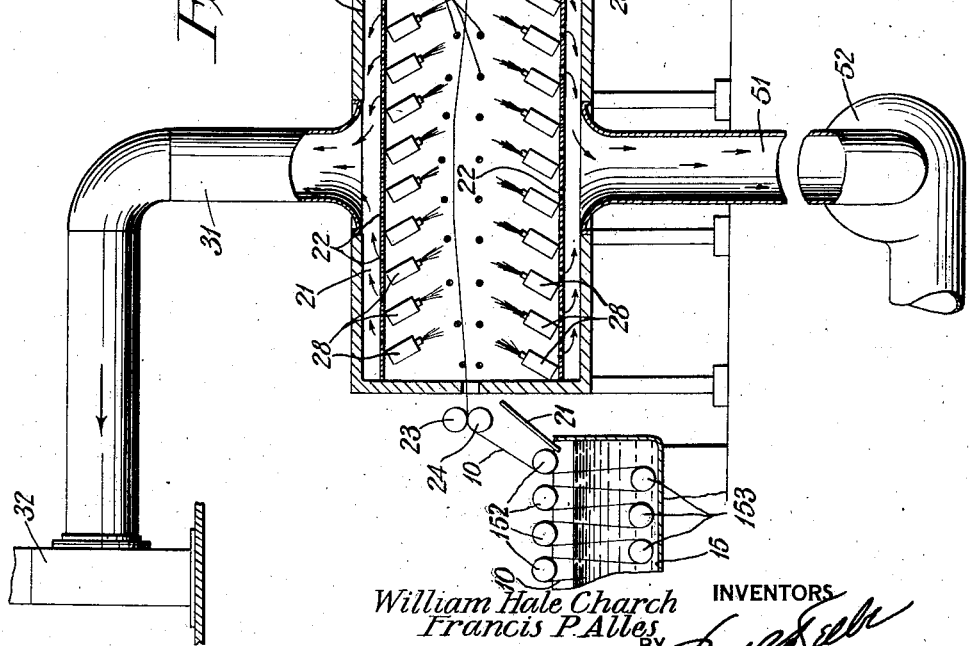
Figure 1 is an illustrative elevation view partly in section, showing a drying apparatus set up in which the regenerated cellulose web is under substantially no tension during the first stages of the drying process.

Such a suitably modified drying set-up as described immediately above is shown in Figure 1, to which reference is now made. In that figure a comparatively wide web of regenerated cellulose which has been cast, regenerated, desulfured, bleached, and washed (but undried), indicated at 10, is led through the final treating tank 15, usually containing a softener solution which impregnates the film with the softener, over rotating rolls 152, and between squeeze rolls 23 and 24 into preliminary drying apparatus indicated generally at 25. The tank 15 contains, in addition to the upper rolls 152, guide members 153. A drain-board 21 returns the excess treating liquid removed by the squeeze rolls 23 and 24 to the treating tank.

The preliminary drying apparatus consists of an inclosure containing a series of jets 28 directing streams of hot air or open gas flames against the sides of the film. Positioned adjacent and below the path of travel of the film may be placed nickel rods 27, in order to support the film and keep it away from the immediate vicinity of the burners. If desired, the jets 28 positioned above the film may be omitted, in which case it may be desired to omit the nickel rods 27. A plurality of narrow outlet openings 22 for the hot gases or products of combustion are provided in the upper and lower portions of the drying chamber. After passing through these openings, the gases enter upper common chamber 21 and lower common chamber 29. From the upper chamber 21 the gases are withdrawn through a conduit 31 by a suction fan 32. The gases in the lower chamber 29 are withdrawn through a conduit 51 by a suction fan 52.

After emerging from the preliminary drying apparatus 25, the film is led over a roll 26 which travels at a lower peripheral rate of speed than the rolls 152, 23 and 24. The rate should be so adjusted that the film during its passage through the drying chamber 25 is under substantially no tension, and is therefore allowed to shrink freely in all directions. At the same time, of course the roll 26 should not be so excessively slow that the film is allowed to pile up in the chamber 25. The film should be so constantly withdrawn from the chamber 25 that substantially the same amount of film remains therein at all times.

The rate of travel through the chamber 25 and the amount and temperature of the heat supplied, should be such that the moisture content of the film is reduced to the required amount (preferably between 100% and 200%) in the substantially complete absence of tension. These factors can be appropriately controlled by one skilled in the art.

After being led over the roller 26, the film travels over a series of drier rolls 40 of the well known type (such rolls are disclosed more in details in U. S. A. Patents Nos. 1,606,824, 2,046,553 and 2,115,132), the speed of which, together with that of the roll 26, is so adjusted that tension whether normal, reduced or elevated is applied to the film from this point down to the point at which it is completely dry. This is necessary, in order to secure film of good transparency and to avoid the formation of puckers and wrinkles, with this apparatus embodiment.

The web or film, after being dried to the desired extent (usually drying to 6% moisture, the common atmospheric equilibrium, is sufficient), is then collected on the winding shaft 60, positioned in a bracket 61 on an upright 62.

In Figure 2 there is shown an apparatus for partially restraining shrinkage during the preliminary stages of drying the gel film. In that figure, 215 represents the final treating tank, and 223 and 224 the squeeze rolls which remove the excess liquid from the film 10 which is in gel condition at that point. A drainboard 221 returns the surplus liquid removed from the web by the rolls 223 and 224 to the tank 215. After passing these squeeze rolls the film enters the preliminary drying chamber, generally indicated at 225. In this chamber the web passes over upper drying rolls 228 and lower drying rolls 227. Both types of rolls have separate drives so that the speed can be adjusted to permit the desired amount of shrinkage during this stage of the drying. When the film has shrunk to the desired amount, it leaves the chamber 225 and passes on to the ordinary drying rolls 240, which prevent further shrinkage while the moisture is being removed to the normal equilibrium figure. After leaving the last of the rolls 240, the web passes to a rotating core 260 upon which it is wound.

In Figures 3, 3—a, 3—b, 3—c and 3—d there is illustrated another type of drying apparatus for incompletely restraining shrinkage during the early stages in the drying of continuous webs. In Figure 3, 315 represents the final tank in the wet end treatment. The continuous web 10 leaves this tank and passes through squeeze rolls 323 and 324 which remove the free liquid therefrom and pass it into an enclosed drying chamber 325. A drain-board 321 returns the liquid removed by the squeeze rolls to the tank 315. In the drying chamber the continuous web first passes about several rolls which are driven by delicate friction means so that practically no pull or tension is exerted thereby on the web as it passes thereover. The web then passes to standard drying rolls which are positively driven and which prevent shrinkage of the film during the remainder of its course through the drier. After leaving the conventional positively driven rolls the web passes out of the drying chamber and is wound on a core at 360 to form a mill roll 361.

The drive for the normal positively driven rolls 340 is illustrated more in detail in Figure 3—d. In this figure a chain drive 341 passes around sprockets on the ends of the rolls 340 and a sprocket gear 342 on a driven shaft connected to a motor or other source of power. An idler sprocket wheel 343 is located between each pair of rolls 340 to facilitate the adjustments and driving of the endless chain 341.

A special arrangement for the circulation of the drying atmosphere is shown in Figure 3. A fan 330 forces air through a duct 331 into a distributing chamber 332 which conducts the air up under the continuous web as it is passing about the rolls 327, 328 and 340. When the air has circulated about the web, part of it is allowed to escape through the stack 326 and part of it is withdrawn from the drying chamber into duct 333 which conducts it back to the fan 330.

The light-friction driven rolls 327 (or 328) which support and convey the web during the first part of its drying, are illustrated in considerable detail in Figures 3—b and 3—c. The supporting rolls (327 and 328) are mounted for free rotation upon a shaft 370. This shaft is hollow having perforations 371 to admit steam to the inside of the roll for heating purposes. The pulleys 372 (on the same shaft as roll 327) and pulleys 382 (on the same shaft as the rolls 328) are driven by an endless belt 373 which passes thereabout in the manner illustrated in Figure 3—a. This belt passes about a number of pulleys and then over a driven pulley on a prime mover or other source of power.

The power communicated to the pulleys 372 and 382 by the belt 373 is passed on to the rolls 327 and 328 by means of the friction drive of Figures 3—b and 3—c, in which a boss 390 on the roll supports a bell crank 391 carrying a friction member 392 which contacts the under side of the driven pulley. Such a member may be of any convenient material such as leather, woven asbestos and the like. The friction member is maintained in contact with the driven pulley by means of an adjustable spring secured to the opposite end of the bell crank. The fixed end of the spring is fastened in a slot in the strap 394. The ends of the strap are fastened to bosses 395 and 396. An adjustment screw 397 threaded in the end of the bell crank, is secured to the movable end of the tension spring.

The operation of the friction drive is believed to be apparent. The friction between the friction button 392 and the inside of the pulley 372 tends to cause the roll 327 to operate at the same speed as the pulley. The tension spring 398 is adjusted by the screw 397 and a selected slot in the strap 394, so that the pressure of the friction button the pulley is at the desired value. As a result, the roll 327 slips (in relation to the pulley 372) so that the speed of the roll 327 corresponds to the travel of the shrinking web 10. The spring 398 can obviously be adjusted to place any desired amount of tension on the roll 327, that is to say, the roll 327 may be arranged to operate at any speed up to the speed of the pulley 372.

The number of frictionally driven and positively driven rolls in the drier will obviously depend upon the results desired. In one common arrangement there are 75 friction driven and 35 positively driven rolls. As will be clear from Figure 3—b, there may be two friction devices on each of the rolls 327 and 328. For clarity in the drawings one only has been shown.

Figure 4 illustrates an arrangement in which shrinkage of the gel web is permitted during the early drying stages without providing separate drives for the preliminary drying rolls 427 (lower) and 428 (upper). In this arrangement the preliminary drying rolls are of constantly decreasing diameter. As will be obvious, the film 10 is permitted to shrink as it passes over these rolls which operate at equal angular velocity because of the difference in periphery. The standard drying rolls 440 which prevent shrinkage are located in the same housing with the preliminary drying rolls. The film 10, after leaving the drying chamber, is wound on to a mill roll 460.

The tension in the regenerated cellulose web during drying depends upon a number of factors, including the percent of machine-direction shrinkage, the moisture content of the film leaving the compensating drying roll section (i. e., the section in which the shrinkage is allowed to take place), the frictional resistance of the compensating rolls, and the number of rolls over which the film passes. The tension is also influenced by the cellulose content of the starting viscose, for example, the higher the cellulose content of the viscose the lower the potential shrinkage of the film. It follows that the drying of the film cannot be satisfactorily described in terms of tension. However, for any given set of conditions (a particular casting machine, a particular viscose, a particular point in the drier, etc.) it is possible to prepare a curve showing the relation between the percent of machine direction shrinkage and the tension on the film which is fairly accurate. An example of such a curve is shown in Figure 5. It is to be emphasized that this curve is for a certain set of conditions, and is not generally applicable to all viscose compositions and drier arrangements which are embraced by the present invention. It applies to one point (the last roll where shrinkage is permitted) only in the drier.

The curve A—O—B—C in Figure 6 illustrates the relation between a machine direction shrinkage and the percent of moisture in the film when the film is dried by being freely suspended, that is, in the absence of tension. The line A—O—B—D illustrates the relation between shrinkage and moisture content for film produced upon the apparatus illustrated in Figure 1. It will be noted that this line follows the free shrinkage curve to the point B. A modification of this drying pattern is illustrated by the curve A—O—P. In the said modification the free shrinkage is stopped much sooner than in the first mentioned arrangement. Films of desirable characteristics may be prepared by applying a constant or varying amount of tension at the very beginning of the drying stage, provided that complete restraint of shrinkage is not maintained. The lines A—L—K and A—N show drying patterns in which a constant amount of tension has been applied to the film. The curves A—J—K and A—L—M illustrate a species of the invention in which shrinkage is prevented after being restrained in the early drying stages. The pattern line A—E—F—G—H—I—Q illustrates a modification in which the extent of tension is altered several times during the drying of the film.

Throughout the specification and claims the parts are given by weight.

Example I

A gel web of regenerated cellulose, as obtained from the last treatment bath, that is, a product which has been subjected to the various processing steps (by being continuously led through successive treating baths) such as coagulation, regeneration, washing, desulfuring, washing, bleaching, washing and glycerinating, was passed over metallic rolls in a set-up such as that disclosed in Figure 2 of the drawings.

This particular web was obtained by casting a viscose containing 8% cellulose and 6% sodium hydroxide into a coagulating bath containing 13% sulfuric acid and 18% sodium sulfate. A section of this film, when allowed to dry with substantially complete elimination of tension in all directions by being freely suspended in air, shrank approximately 17% in the machine direction and 35% in the transverse direction. This shrinkage is commonly known as potential (maximum) shrinkage.

The rolls over which the gel web passed in the initial drying stages were heated internally by means of steam to an average surface temperature of approximately 68° C. During the process the air supplied to this part of the drier had a relative humidity of approximately 14%. The air was maintained at approximately 80° C. The time of treatment was sufficient to reduce the moisture content of the film to 12% (based on the cellulose), and the speed of the individual rolls was adjusted to allow the film to shrink 5% in the machine direction.

The film was then passed on to the uniform speed positively driven rolls heated to a temperature of 80° C. These rolls reduced the moisture content of the film to 6%, and prevented further machine direction shrinkage. Because the rolls were positively driven at a constant speed, a tension developed which was appreciably in excess of that developed in the film during the preliminary drying step.

The film so produced was found to be transparent and more durable than that produced by methods ordinarily used in the past, for example, processes in which shrinkage in the machine direction is prevented during the drying down to 6% moisture. The new product had a low permanent shrinkage and good sticking resistance and, incidentally, also exhibited perfect flatness whether led out upon a plane surface or when a considerable length was supported at its opposite ends only (improved pullout).

Example II

A gel regenerated cellulose film from the last treatment bath in an ordinary viscose regenerated cellulose apparatus was passed through the first stage of a drier such as that illustrated in Figure 2 of the drawings, under such conditions that 3.5% machine direction shrinkage was allowed. The temperature of the rolls and the relative humidity and temperature of the roll environment were the same as in Example I. As the web left the preliminary drier it had a moisture content of 10%, based on the cellulose. It was then passed on to the final stage drying rolls, which reduced its moisture content to 5% while preventing further machine direction shrinkage. The last set of drying rolls were positively driven and heated to a temperature of 80° C.

The film so produced was found to have excellent durability and transparency. It had reduced permanent shrinkage (compared with film produced in the conventional manner).

*Example III*

A gel regenerated cellulose web of the type described in Example I was passed through the first stage of a drier such as that shown in Figure 3. The rolls were so operated that the web had shrunk 3.5% in the machine direction as it was passed to the final set of drying rolls. During the preliminary drying the moisture content of the film was reduced to 80%, based on the cellulose. In the second stage of drying shrinkage was prohibited in the machine direction and the moisture content reduced to 6%. Desirable durability and transparency characteristics were obtained.

*Example IV*

The process of Example III was repeated with the speed of the preliminary drying rolls adjusted so that 5% machine direction shrinkage was permitted in the first stage of the drying. The moisture content of the film was 120% as it passed to the second stage drying roll upon which it was dried down to 6% moisture in the absence of further shrinkage. A product of very desirable durability and transparency characteristics was obtained.

*Example V*

A regenerated, purified, washed and glycerinated cellulose film from the last treatment bath was passed through the apparatus shown in Figure 1. During the passage through the first stage of the drier, in which it was unsupported and allowed to shrink freely in all directions, its moisture content was reduced to 100%, based on the weight of the cellulose. It was then passed to the second stage drying rolls, which prevented further shrinkage and reduced the moisture content to 6%. The films thus produced were materially tougher and more durable than films dried in the normal manner.

*Example VI*

A web of regenerated cellulose prepared from viscose in the usual manner but not softened, was passed while still in a gel state into a preliminary drier of the type illustrated in Figure 1. It was allowed to shrink freely during its passage through this piece of apparatus, and its moisture content was reduced to 200%, based on the cellulose. It was then passed over the final stage drying rolls, which prevented further shrinkage and reduced the moisture content to 6%. The films thus produced were very tough.

*Example VII*

The procedures of Examples V and VI were repeated many times. In all cases the films had moisture contents of 100% to 200% as they left the preliminary drier.

Table 1 indicates the results of tests made on films of Examples V, VI and VII. An average of 24 samples was taken in each case, both on samples of ordinary regenerated cellulose film dried under tension in accordance with the prior art, and with regenerated film having increased toughness as a result of the drying processing outlined in the same examples. The films tested were approximately 0.001 inch thick. The term "drops" refers to the number of times a filled bag manufactured of the film being tested could be dropped without splitting, in accordance with the test outlined near the end of this specification.

*Table 1*

| Percent glycerin | Drops before breaking | |
|---|---|---|
| | Untoughened (ordinary) film | Toughened (the film of Ex. V, VI and VII) |
| 0 | 67 | 125 |
| 14.3 | 170 | 248 |

It will be seen that the film processed according to this invention is much tougher than film, with the same amount of softener, produced in accordance with the prior art. As shown by the table, the improvement in all cases was at least 25%. In most cases it is in excess of this figure.

In general the invention is applicable to the manufacture of non-fibrous cellulosic sheets and films which are subject to shrinkage during drying. The results obtained with this general type of film are especially satisfactory in the embodiment where the web is allowed to shrink freely, i. e., with a substantially complete absence of tension (using the apparatus set-up of Figure 1 in which no more tension is applied to the web than is necessary to move it through the apparatus), during the preliminary drying stage. This particular preliminary drying step should not be carried below 100% moisture, since in the lower moisture range complete absence of tension (other than that necessary to move the film through the apparatus) will produce puckers and wrinkles and will impair the transparency of the film.

As previously indicated, a given tension pattern will not result in a given shrinkage pattern, since the relation of these two factors is usually governed by the kind of viscose, the type of treatment in the wet end (i. e., in the various treating baths prior to drying), the temperatures and duration of drying treatment, and related matters. Tension determinations are quite difficult and highly unsatisfactory. On the other hand, shrinkage measurements are quite satisfactory and very simple to make, since the shrinkage of a film between any two points in its travel through the casting and/or drying apparatus can be determined by measuring the speed of rotation of the roll in one position and comparing it with the speed of rotation of the roll in a later position. Experience indicates that such factors as toughness, permanent shrinkage, and the like, can be definitely correlated with shrinkage of the gel film during drying.

It is not possible to select specific amounts of shrinkage as constants in defining the present invention, since different types of film shrink different amounts. The type of viscose, the thickness of the film, the presence or absence of a softener, and like factors, influence the shrinkage materially. Since each type of film has a maximum amount of shrinkage of which it is capable (for convenience called "potential shrinkage"), the most satisfactory way of describing the present invention is to define the percent of the potential shrinkage which has taken place.

A film prepared by extruding viscose (in pellicular form) containing 8% cellulose and 6% sodium hydroxide from a hopper 80 inches wide into a bath containing 13% sulfuric acid and 18% sodium sulfate, and thereafter led through successive acid (for further regeneration), washing (this purification may utilize water at appropriate temperatures), desulfuring, bleaching and softening (this impregnation with softener is usually a glycerinating) baths, when allowed to dry with substantially complete elimination of tension in all directions, underwent a shrinkage of approximately 17% in the machine direction and 35% in the transverse direction.

A tension pattern for a standard drier (i. e., a drier not permitting shrinkage) handling a web of material 50 inches wide (at the wind up) at a rate of 45 meters per minute, is given in Table 2.

*Table 2*

| Drier roll number | Moisture content | Tension in pounds per 50" wide web | Tension in pounds per inch width |
|---|---|---|---|
| | *Percent* | | |
| 1 | 320 | | |
| 7 | 210 | | |
| 20 | 130 | 15 | 0.30 |
| 30 | 75 | 18 | 0.36 |
| 40 | 30 | 28 | 0.56 |
| 50 | 10 | 55 | 0.93 |
| 53 | 8 | 103 | 2.06 |
| 55 | 6 | 110 | 2.20 |
| | | 60 | 1.20 |

Sheets and films may be (and have been) manufactured (cast) in several different thicknesses, and although thinner or thicker sheets have been produced for other and special purposes, the material produced for ordinary purposes is about 0.001 of an inch thick. These films (as ordinarily produced) have satisfactory tensile strength for certain purposes, but they do not have the required degree of toughness to satisfactorily resist the shock and handling to which they are ordinarily subjected in commercial applications. The tensile strength of a film is measured by the magnitude of the force necessary to rupture it, and depends upon the cohesive forces existing within the structure of the film. The toughness of a film is measured by the length of time it will resist rupture under actual handling conditions, and depends primarily upon its elongation or the degree to which it will resist sudden shock or yield to a force without breaking. These two factors are clearly distinguishable. For example, a film of as high tensile strength as it has hitherto been possible to produce may lack toughness in that it will fail to yield sufficiently to the shocks encountered in commercial use to avoid premature breaking, cracking or splitting.

In the films of the prior art it has been customary to impart a certain amount of toughness or durability, together with flexibility, by incorporating therein a softener, such as glycerin or ethylene glycol. Besides the question of expense, the use of these materials is attended with certain difficulties. The film tends to become sticky, and various precautions are therefore necessary in order to avoid "caking" of film in rolls or stacks or sheets. For example, film containing above 14% glycerin must usually be sized or provided with a tenuous coating of a suitable substance to avoid this sticking. At still higher glycerin contents the sizing must be so thick that it becomes a true coating. Additionally, the film becomes so soft that it is extremely difficult if not impossible to handle by means of automatic machinery. Furthermore, the high hygroscopicity of these softeners tends to cause the film to absorb more water than it would in their absence, and therefore to vary more widely in dimensions with the relative humidity of the atmosphere. Finally, the use of liquid softeners detracts somewhat from the strength or tenacity of the film. As these objectionable characteristics vary directly with the amount of glycerin or similar softener used, a point will be reached where it is no longer practically possible to increase the softener content. It has been found to be of advantage for some uses to increase the toughness without increasing the softener content, and for other uses to secure the advantages of a lower softener content while still retaining the desired degree of flexibility and toughness or durability.

Films or pellicles prepared in accordance with the present invention (particularly the embodiments of Examples V, VI and VII) and containing normal amounts of a softener such as glycerin, exhibit greatly improved durability or toughness over similar films containing the same amounts of softener, and dried according to the prior art, as shown by Table 1 above. Despite the fact that the glycerin content is the same, they also exhibit increased freedom from stickiness. For example, regenerated cellulose film prepared in accordance with the present invention and containing 14% glycerin will not exhibit objectionable sticking for approximately seventeen days at 80% relative humidity and one pound per square inch pressure, whereas regenerated cellulose film prepared in the manner known heretofore, and containing the same amount of glycerin, under the same conditions will exhibit objectionable sticking in approximately two to three days.

In the practice of this invention it has also been found possible to use much lower amounts of softener than are used in the ordinary type of film, and still retain the required degree of toughness. The advantages of such a procedure are, as pointed out above, increased freedom from stickiness, less susceptibility to changes in atmospheric moisture, and greater tenacity. The cost factor in using lower quantities of glycerin is obvious.

In all cases, in addition to the above advantages, film prepared according to this invention exhibits freedom from wrinkles and puckers and no impairment of transparency.

The lower limit of the first drying stage is fairly flexible, the moisture content lying in the range of from 10%–20%. It is not possible at present to go much below 10% without affecting the smoothness of the sheet. It may be observed here, that the prevention of shrinkage in the final stage of drying affects materially the final flatness and freedom from puckers of the film. In addition to this, however, the shrinkage of the film must be further restrained, when the preliminary drying step takes the film below 100% moisture, in order to produce a transparent sheet. It is for this reason that the maximum or potential shrinkage of the film cannot be allowed to take place, but the whole drying process must be carried out under some small tension value. Shrinkage up to 10% on an abstract or initial dimension basis can generally be tolerated in the controlled drying stage.

Although the invention has been described in terms of, and is particularly useful for, the production of regenerated cellulose sheeting and films cast from viscose, it is also applicable to the production of cellulosic sheets and films from aqueous alkaline cellulosic solutions (or dispersions) coagulable in an acid coagulating bath, including, for example, regenerated cellulose produced from cuprammonium cellulose and the lowly etherified or lowly esterified cellulose.

The invention finds its greatest use in its application to films and sheets of gel regenerated cellulose, that is, cellulosic films or webs which have been coagulated and/or regenerated, washed, bleached, desulfured, and glycerinated but not yet dried. Improved results can also be obtained in treating sheets and films which have been previously dried by rewetting the same and redrying them in accordance with the present invention.

The series of heated rolls or rollers over which the web passes while drying may be made of any desired material, for example, steel or aluminum, and may be heated in any satisfactory manner, such as by internal circulation of hot water or steam. Drying atmospheres of low relative humidity or elevated temperatures additionally facilitate and expedite the reduction in moisture content. Removal of any surface liquid on the film after it leaves the last treating bath by passage through squeeze rolls, doctor knives, and related apparatus, is obviously advantageous because it reduced the burden on the drier.

Drying rolls supported on freely running bearings and powered by non-positive driving mechanisms in such a manner that they (the rolls) are free to follow the motions of the film passing through the drier, have given very desirable results. In this way the exertion of undesired unexpected restraining forces (in the machine direction) upon the film is avoided or reduced to an acceptable degree.

Since shrinkage in the transverse direction suffers only such restraint as is offered by the friction between the surface of the roll and the film (this is far less restraint than that suffered in the machine direction), considerable can be done to insure a uniformity of physical properties (in the finished film) by suitably preparing the roll surface.

It will be understood that the rolls which prevent shrinkage in the final stage of the drying (in the preferred procedure of this invention shrinkage is not prevented, i. e., completely restrained, except in the final stage) operate in a manner corresponding to that described as normal operation, i. e., they effect the considerable amount of tension (both in the longitudinal and transverse direction) which is necessary to keep the web of approximately the same dimensions while it is approaching its final moisture content of about 6%.

Although the gel film used as a starting material in Examples I and II contained 360% water and 14% glycerol as a softener, it will be understood that similar results are obtained with other quantities of, or in the absence of, a softener.

In order to test the toughness of various types of film under actual handling conditions, the following test has been devised. A sample of the film to be tested is formed into a bag, and 200 grams of dry white beans inserted therein. The bag is closed so as to leave the film tightly wrapping the beans, without loose flaps, and sealed by means of a piece of pressure-sensitive regenerated cellulose adhesive tape. The bag is then repeatedly dropped from a height of two feet onto a glass plate, in an atmosphere of 35% relative humidity. The number of times that it can be dropped without breaking is a direct measure of its toughness, and may be considered, for the purpose of this specification, as the toughness factor.

The freedom from puckers and wrinkles or any bulging or warping of a sheet that prevents it from lying perfectly flat upon a plane surface, constitutes flatness of sheet.

Pull-out is defined as the contour of a transverse section of a sheet supported by horizontal position over two horizontal rolls spaced some distance apart. Poor pull-out is defined as such a contour which departs markedly from a straight line.

The loss in dimensions with age and use or irreversible shrinkage, is commonly referred to in the art as "permanent shrinkage" to distinguish it from reversible changes in dimensions which presumably result solely from gain or loss in moisture by a sheet of cellulose. The term "deformation" is ordinarily employed to describe the reversible changes in dimensions which a sheet of regenerated cellulose undergoes with changes in its internal moisture content.

In order to measure the permanent shrinkage of a piece of film, the following method has been devised:

A sample of the finished film to be tested is allowed to come to equilibrium with respect to moisture content in an atmosphere of 35% relative humidity at a temperature of 75° F., and the dimensions then measured. The film is next placed in an atmosphere of 95% relative humidity at a temperature of 95° F. for a period of two hours, during which time substantially all of the permanent shrinkage is eliminated, since strains are more quickly relieved at high moisture contents of the film. The film is then subjected to a relative humidity of 0%–5% at 95° F. for two hours. Finally, the film is brought back to the atmosphere of 35% relative humidity at 75° F., allowed to come to equilibrium with respect to moisture content, and again measured. The percentage decrease in dimensions between initial and final measurement is the amount of permanent shrinkage in the film. In the ordinary regenerated cellulose films of the prior art it amounted to about 3.5% to 6% in each direction on a rectangular piece of film, or a total of about 10%.

For the purposes of this invention the term "substantially no permanent shrinkage" will mean a total permanent shrinkage, including both directions, of less than 2%, and preferably less than 1%.

In attaining one of the aforementioned objects of the invention, i. e., by conducting the preliminary drying step with a substantially complete absence of tension, it has been found that non-fibrous cellulosic sheets and films much tougher per unit of thickness than heretofore known, are obtainable, and that at the same time such sheets and films retain good transparency and remain free from wrinkles and puckers. Such products can be produced by substantially eliminating tension during the first portion of the drying operation and by drying with normal increased or reduced tension thereafter, as disclosed in the specific examples. Furthermore, sheets and films produced in this manner will exhibit the desired degree of flexibility and toughness with lower amounts of softener. It has been found, in accordance with this invention, that contrary to the processes used in making the ordinary film of regenerated cellulose, this special type of film can be made in such a way that free shrinkage in all directions is allowed during the early stage of the drying step, that is, without subjecting the gel web to tension other than that necessary to move it through the drying apparatus while the water content (based on the weight of the cellulose) is being reduced to about 100% to 200%.

In addition to the combination of reduced permanent shrinkage (approximately equivalent to that obtainable by the procedure described in U. S. A. Patent No. 2,115,132) and toughness far beyond that obtainable by drying in the normal (for example, U. S. A. Patent No. 1,548,864) manner, the regenerated cellulose sheet of this invention has other desirable properties. Among these are improved surface characteristics like freedom from sticking under storage conditions, good slip, etc. These properties are decidedly improved over those in corresponding sheet produced by any methods heretofore known.

By employing various shrinkage patterns in accordance with Figure 6 or modifications thereof (that is, by varying the drying conditions) the permanent shrinkage can be adjusted to any desired value. In the same way toughness can also be predetermined.

As many apparently widely different embodiments of this invention may be made without departing from the spirit and scope thereof, it is to be understood that we do not limit ourselves to the specific embodiments thereof except as defined in the appended claims.

We claim:

1. In the method of producing non-fibrous, cellulosic sheets and films from aqueous alkaline celululosic solutions the steps comprising coagulating said sheets and films, purifying the same, preliminarily drying the same, with substantially complete elimination of tension, until the moisture content has been reduced to such an extent that further drying under tension will result in an improvement in toughness of the said sheets and films over that which will result in the absence of said preliminary drying step, said sheets and films after said preliminary drying step containing at least 100% moisture based on the weight of the cellulosic material, and completing the drying of said films under tension.

2. In the method of producing non-fibrous, cellulosic sheets and films from aqueous alkaline cellulosic solutions the steps comprising coagulating said sheets and films, purifying the same, preliminarily drying the same to a point at which they contain between 100% and 200% moisture based on the weight of the cellulosic material, with substantially complete elimination of tension, and completing the drying of said films under tension.

3. In the method of toughening non-fibrous, cellulosic sheets and films cast from aqueous alkaline cellulosic solutions, the steps which comprise passing said films in gel condition through a bath containing a softening agent, preliminarily drying the same, with substantially complete elimination of tension, until the moisture content has been reduced to such an extent that further drying under tension will result in an improvement in toughness of the said sheets and films over that which will result in the absence of said preliminary drying step, said sheets and films after said preliminary drying step containing at least 100% moisture based on the weight of the cellulosic material, and completing the drying of said films under tension.

4. In the method of toughening non-fibrous, cellulosic sheets and films cast from aqueous alkaline cellulosic solutions, the steps which comprise passing said films in gel condition through a bath containing a softening agent, preliminarily drying the same to a point at which they contain between 100% and 200% moisture based on the weight of the cellulosic material, with substantially complete elimination of tension, and completing the drying of said films under tension.

5. In the method of toughening regenerated cellulose sheets and films, the steps which comprise preliminarily drying gel regenerated cellulose sheets and films to a point at which they contain between 100% and 200% moisture, based on the weight of regenerated cellulose, with substantially complete elimination of tension, and completing the drying of said films under tension.

6. In the method of toughening regenerated cellulose sheets and films, the steps which comprise passing said films in gel condition through a bath containing a softening agent, preliminarily drying the same, with substantially complete elimination of tension, until the moisture content has been reduced to such an extent that further drying under tension will result in an improvement in toughness of the said sheets and films over that which will result in the absence of said preliminary drying step, said sheets and films after said preliminary drying step containing at least 100% moisture based on the weight of regenerated cellulose, and completing the drying of said films under tension.

7. In the method of toughening regenerated cellulose sheets and films, the steps which comprise passing said sheets and films in gel condition through a bath containing a softening agent, preliminarily drying the same to a point at which they contain between 100% and 200% moisture based on the weight of regenerated cellulose, with substantially complete elimination of tension, and completing the drying of said sheets and films under tension.

8. In the method of toughening regenerated cellulose sheets and films, the steps which comprise passing said films in gel condition through a bath containing glycerin, preliminarily drying the same, with substantially complete elimination of tension, until the moisture content has been reduced to such an extent that further drying under tension will result in an improvement in toughness of the said sheets and films over that which will result in the absence of said preliminary drying step, said sheets and films after said preliminary drying step containing at least 100% moisture based on the weight of regenerated cellulose, and completing the drying of said sheets and films under tension.

9. In the method of toughening regenerated cellulose sheets and films, the steps which comprise passing said films in gel condition through a bath containing glycerin, preliminarily drying the same to a point at which they contain between 100% and 200% moisture based on the weight of regenerated cellulose, with substantially complete elimination of tension, and completing the drying of said sheets and films under tension.

10. A process which comprises reducing the moisture content of gel regenerated cellulose sheets continuously cast from viscose in the absence of tension sufficient to prevent shrinkage until the sheet has shrunk lengthwise 10% to 60% of the total amount of lengthwise shrinkage of which such sheet is capable, and thereafter further reducing the moisture content of the sheet to about 6% while preventing further lengthwise shrinkage.

11. Improved regenerated cellulose film having less permanent shrinkage than regenerated cellulose film produced from identical viscose in an identical manner up to the drying stage and dried while preventing shrinkage, and having greater toughness than regenerated cellulose film produced from identical viscose in an identical manner up to the drying stage and dried while preventing shrinkage until the water content has been reduced to 40% (based on the cellulose), and dried from 40% to 6% water content without restraining shrinkage, the said improved regenerated cellulose film being in the chemical and physical condition resulting from drying the said film from gel condition until it has shrunk lengthwise 10% to 60% of the total lengthwise shrinkage of which such film is capable in the absence of tension sufficient to prevent shrinkage, and thereafter further reducing the moisture content of the film to 6% at most, while preventing lengthwise shrinkage.

12. The process which comprises passing continuous gel regenerated cellulose web through a drier while restraining but without preventing shrinkage until the water content has been reduced to between 200% and 100% based on the weight of the regenerated cellulose, whereby the web is permitted to shrink, and thereafter reducing the moisture content to about 6% while preventing shrinkage.

13. The process which comprises passing continuous gel regenerated cellulose web through a drier in substantially complete absence of tension in the web, until the web has shrunk lengthwise 10% to 60% of the total amount of lengthwise shrinkage of which such web is capable, and thereafter reducing the moisture content to about 6% while preventing shrinkage of the web.

14. A process for producing increased toughness and decreased permanent shrinkage in regenerated cellulose film, which comprises preliminarily drying the gel film while restraining, but not preventing, shrinkage until the film has shrunk lengthwise 10% to 60% of the total amount of lengthwise shrinkage of which such film is capable, and finally drying the preliminarily treated material to at most 6% moisture while preventing shrinkage.

15. A process for producing increased toughness and decreased permanent shrinkage in regenerated cellulose film, which comprises preliminarily drying the gel film, after passing it through a glycerol softening bath, to a point at which it contains between 200% and 10% moisture (based on the weight of the cellulose) without preventing shrinkage at any time but while maintaining it under a tension sufficient only to restrain shrinkage to 10% to 60% of the potential shrinkage, and finally drying the preliminarily treated material to at most 6% moisture while under tension sufficient to prevent shrinkage.

WILLIAM HALE CHARCH.
FRANCIS P. ALLES.